Sept. 20, 1971 REIJIRO KAWANO 3,605,978

TYPE-SELECTING MECHANISM PROVIDING VISIBILITY OF PRINTED CHARACTERS DURING FUNCTION OPERATIONS

Filed Feb. 25, 1970 9 Sheets-Sheet 1

Sept. 20, 1971 REIJIRO KAWANO 3,605,978

TYPE-SELECTING MECHANISM PROVIDING VISIBILITY
OF PRINTED CHARACTERS DURING FUNCTION
OPERATIONS

Filed Feb. 25, 1970 9 Sheets-Sheet 2

FIG. 14

| | | | | | | | | |
|---|---|---|---|---|---|---|---|---|
| $b_7$ | 0 | 0 | 0 | 0 | 1 | 1 | 1 | 1 |
| $b_6$ | 0 | 0 | 1 | 1 | 0 | 0 | 1 | 1 |
| $b_5$ | 0 | 1 | 0 | 1 | 0 | 1 | 0 | 1 |

| $b_7$~$b_5$ | $b_4$ | $b_3$ | $b_2$ | $b_1$ | | 0 | 1 | 2 | 3 | 4 | 5 | 6 | 7 |
|---|---|---|---|---|---|---|---|---|---|---|---|---|---|
| | 0 | 0 | 0 | 0 | 0 | NUL | DLE | ⧄ | 0 | @ | P | | |
| | 0 | 0 | 0 | 1 | 1 | SOH | $DC_1$ | ! | 1 | A | Q | | |
| | 0 | 0 | 1 | 0 | 2 | STX | $DC_2$ | " | 2 | B | R | | |
| | 0 | 0 | 1 | 1 | 3 | ETX | $DC_3$ | # | 3 | C | S | | |
| | 0 | 1 | 0 | 0 | 4 | EOT | $DC_4$ | $ | 4 | D | T | | |
| | 0 | 1 | 0 | 1 | 5 | ENQ | NAK | % | 5 | E | U | | |
| | 0 | 1 | 1 | 0 | 6 | ACK | SYN | & | 6 | F | V | | |
| | 0 | 1 | 1 | 1 | 7 | BEL | ETB | ' | 7 | G | W | | |
| | 1 | 0 | 0 | 0 | 8 | BS | CAN | ( | 8 | H | X | | |
| | 1 | 0 | 0 | 1 | 9 | HT | EM | ) | 9 | I | Y | | |
| | 1 | 0 | 1 | 0 | 10 | LF | SUB | * | : | J | Z | | |
| | 1 | 0 | 1 | 1 | 11 | VT | ESC | + | ; | K | [ | | |
| | 1 | 1 | 0 | 0 | 12 | FF | FS | , | < | L | ¥ | | |
| | 1 | 1 | 0 | 1 | 13 | CR | GS | — | = | M | ] | | |
| | 1 | 1 | 1 | 0 | 14 | SO | RS | . | > | N | ^ | | |
| | 1 | 1 | 1 | 1 | 15 | SI | SPACE | / | ? | O | — | | DEL |

FIG. 16

| | | | | | | | | |
|---|---|---|---|---|---|---|---|---|
| $b_6$ | 0 | 0 | 0 | 0 | 1 | 1 | 1 | 1 |
| $b_5$ | 0 | 1 | 1 | 0 | 0 | 0 | 0 | 1 |
| $b_4$ | 0 | 1 | 0 | 1 | 0 | 1 | 0 | 1 |

| $b_6$~$b_4$ | $b_3$ | $b_2$ | $b_1$ | | 0 | 1 | 2 | 3 | 4 | 5 | 6 | 7 |
|---|---|---|---|---|---|---|---|---|---|---|---|---|
| | 0 | 0 | 0 | 0 | @ | H | P | X | ⧄ | ( | 0 | 8 |
| | 0 | 0 | 1 | 1 | A | I | Q | Y | ! | ) | 1 | 9 |
| | 0 | 1 | 0 | 2 | B | J | R | Z | " | * | 2 | : |
| | 0 | 1 | 1 | 3 | C | K | S | [ | # | + | 3 | ; |
| | 1 | 0 | 0 | 4 | D | L | T | ¥ | $ | , | 4 | < |
| | 1 | 0 | 1 | 5 | E | M | U | ] | % | — | 5 | = |
| | 1 | 1 | 0 | 6 | F | N | V | ^ | & | . | 6 | > |
| | 1 | 1 | 1 | 7 | G | O | W | — | ' | / | 7 | ? |

United States Patent Office 3,605,978

Patented Sept. 20, 1971

3,605,978

TYPE-SELECTING MECHANISM PROVIDING VISIBILITY OF PRINTED CHARACTERS DURING FUNCTION OPERATIONS

Reijiro Kawano, Tokyo, Japan, assignor to Kurosawa Tele-Communications Limited, Tokyo, Japan Continuation-in-part of application Ser. No. 761,518, Sept. 23, 1968. This application Feb. 25, 1970, Ser. No. 14,134

Int. Cl. B41j *1/40*

U.S. Cl. 197—55 3 Claims

ABSTRACT OF THE DISCLOSURE

A typewriting mechanism comprising a selectively positioned type head in its longitudinal and/or in its rotary or lateral direction by means of selective lever assemblies electromagnetically operated by being supplied with coded binary signals, means being provided for receding the type head from its selected working position to its most convenient position for the necessary observation of already typewritten sentences on the typewriting paper under use, when at least a group of binary selection signals has been received.

This application is a continuation-in-part of application Ser. No. 761,518, entitled Type Selecting Mechanism for Type Head, filed Sept. 23, 1968, now abandoned.

BACKGROUND OF THE INVENTION

Field of the invention

This invention relates to improvements in and relating to a typewriting mechanism wherein type cylinder type box or the like type head is utilized.

Description of the prior art

It is a considerable drawback frequently met with the above kind of typewriting mechanism that after the type head has been positioned to a certain selected position upon being subjected to a longitudinal and a rotational or lateral selection operation and upon a typing operation being completed, the typewritten or printed characters on the paper cannot be seen by the typist, because they are hidden by the type head per se kept in its working position. This is especially a problem at the idle stage between typewriting operations because at such time the typist is most desirous to look at the already typewritten sentences.

SUMMARY OF THE INVENTION

It is therefore the main object of the present invention to provide an improved typewriting mechanism usable in automatic typewriter machines, computer input and output equipment, and the like, wherein means are provided to recede the type head from its formerly selected working position to its most convenient position for visual observation by the typist of the typewritten sentences or the like on the typewritten sheet under use, when the next succeeding coded binary group of bits has not yet been received or a space code is being treated.

It is a further object of the present invention to provide a typewriting mechanism capable of receding the type head from its previously selected-out position to its lowest position for providing a convenient chance for making a visual inspection of already typewritten information.

BRIEF DESCRIPTION OF THE DRAWINGS

These and further objects, features and advantages of the invention will become more apparent from the following detailed description when the same is read in connection with the accompanying drawings which constitute part of the specification and illustrate a preferred embodiment of the invention. It is to be expressly understood, however, that the drawings are for the purpose of illustration only and are not intended as a definition of the limits for the invention.

In the drawings, wherein like reference characters and numerals refer to like parts throughout the several views:

FIG. 14 is a table showing the relationship among the input coded signals, type characters, and telecommunication and typewriting functions.

FIG. 16 is a table showing the relationship between the type characters and the input coded signals which are not concerned with the function signals.

DESCRIPTION OF THE PREFERRED EMBODIMENT

Referring now to the accompanying drawings a preferred embodiment of the invention will be specifically described.

Figure 1:
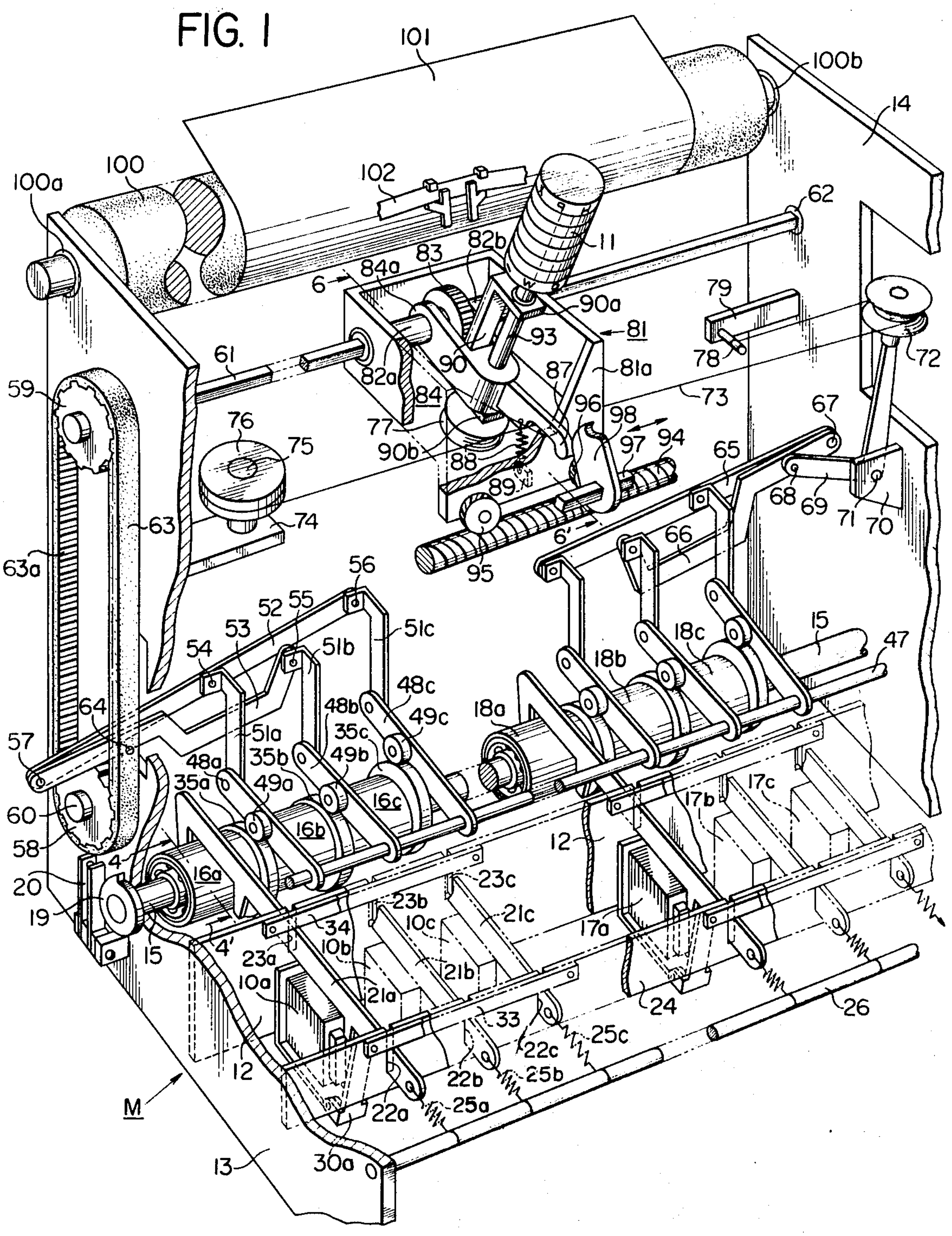
FIG. 1 is a schematic perspective view of essential parts of the typewriter machine according to this invention wherein several known mechanical, electric and electronic components have been omitted from the drawing for simplicity.

In FIG. 1, numerals 10*a*, 10*b* and 10*c* denote a series of three independently operable selector magnets adapted for selectively positioning a cylindrical type head 11 in its axial direction for the purpose to be described, said magnets being fixedly mounted on an intermediate tie plate 12 bridging two side wall panels 13 and 14 of an open box-shaped machine frame generally shown at M, being the frame of the typewriter according to this invention, said frame having a bottom wall panel and a rear wall panel, although not shown for simplicity of the drawing. Said axial positioning movement of the type head 11 is called "shift" throughout this specification.

An elongated main drive shaft 15 is rotatably mounted in suitable bearings, not shown, by said side wall panels 13 and 14 and adapted for rotating at a constant speed such as 1,200 r.p.m. from a main electric motor which has been omitted from the drawing for simplicity. On the main shaft 15, there are mounted a series of, herein three in number, independent clutches 16*a*, 16*b*, and 16*c* provided for shift section service.

Numerals 17*a*, 17*b*, and 17*c* denote a series of stationary selector magnets which are equally mounted fixedly on said tie plate 12 and adapted for use in rotational positioning service to be described for the type head 11.

In a manner similar to shaft service clutches 16*a*–16*c*, said main shaft 15 has mounted thereon a series of independently operatable rotational selection service clutches 18*a*, 18*b* and 18*c*.

On the projecting end of the main shaft 15 from the side wall panel 13, a timing cam 19 is fixedly mounted and cooperates with a pair of break-make contacts which are mounted on said panel 13, the purpose of which will be described more in detail hereinafter.

There are provided a plurality of, herein three, trip levers 21*a*, 21*b*, and 21*c* in one-to-one relationship to shift selection service clutches and selector magnets, said levers being slidably guided, each by a pair of guide slots 22*a*, 23*a*; 22*b*, 23*b*; and 22*c*, 23*c* which are formed in tie plates 24 and 12, respectively. Said trip levers 21*a*–21*c* are provided at their one end with respective tension springs 25*a*, 25*b*, and 25*c*, thus being positioined in their rearmost off-service position wherein the clutches are kept in disengaged position. The opposite ends of these tension springs are kept in engagement with an axially extending tie rod 26 between both side wall panels 13 and 14.

Figure 5:
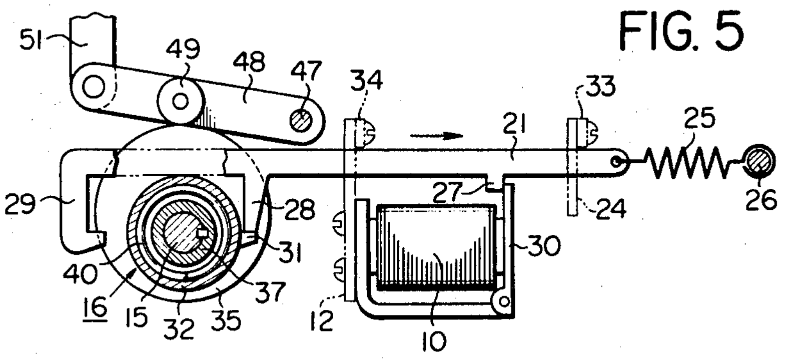
FIG. 5 is a similar view to FIG. 4, wherein the operating magnet is in its energized position.
Figure 4:
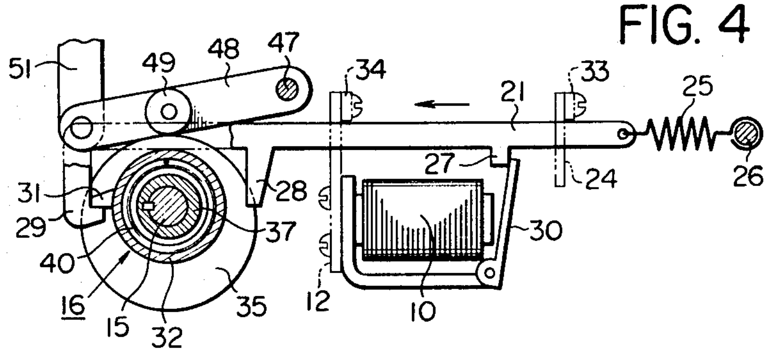
FIG. 4 is a partial cross-sectional view taken substantially along a section line 3–3′ shown in FIG. 1, mainly showing a clutch cam assembly attached with an operating magnet which is in its de-energized position.

Each of these trip levers, representatively denoted 21 in FIGS. 4 and 5, has three remote projections 27, 28, and 29, said projection 27 being always kept in contact with the armature 30 pivotally cooperating with the respective selector magnet which is shown representatively at 10.

In FIG. 4, the selector magnet 10 is shown in its deenergized position, wherein the innermost lever projection 29, hook-shaped as shown, is kept in engagement with a stop 31 radially and outwardly projecting from cylindrical clutch case member 32. The middle lever projection 28 is out of contact with said stop 31 and said case member.

Elongated stops 33 and 34 are fixedly mounted on the tie plates 24 and 12, respectively, along the upper edges, for preventing trip levers 21*a*–21*c* from disengagement from respective guide slots 22*a*–*c* and 23*a*–*c*. Eccentric cam 35 is attached to clutch case member 32 for unitary rotation therewith, as will be most clearly seen from FIG. 8. Between said main shaft 15 and said cam 35, there is proved anti-friction bearings as at 36. Inner sleeve 37 is keyed as at 38 to the main shaft which mounts anti-friction bearing 39 for supporting rotatably said clutch 16. Between the annular space defined between clutch case 32 and said inner sleeve 37, a clutch spring 40 in the form of a coil spring is inserted, one end of which is bent up radially to form a hooked end 41 received in a slot 42 formed in the case 32, while the opposite end of the spring is bent up axially to form another hook end 43 received in a blind hole 44 formed in the shift cam 35. This clutch spring is kept in position forcibly in such a way that it is so elastically deformed to have a larger coil diameter than that corresponding to its natural and thus non-deformed state, by arresting its both extremities in the above mentioned manner. Therefore, when a mechanical turning effort is applied so as to reduce the amount of said elastic deformation, the coil diameter will be reduced. In practice, the clearance between the outside periphery of inner sleeve and the inside periphery of said clutch spring amounts generally only to 0.1–0.2 mm., although in the drawing this clearance has been shown in an exaggerated manner for clearness of the drawing.

Figures 8, 9:
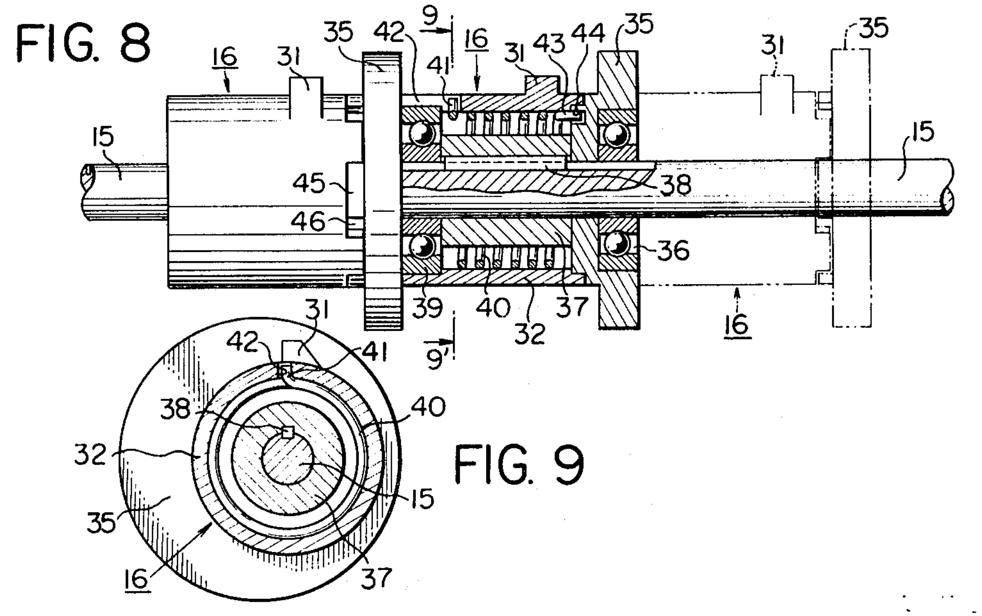
FIG. 8 is a partially sectional view of three of a series of successive clutch units.
FIG. 9 is a cross-sectional view of one of the clutch unit series, taken along a sectional line 9–9′ shown in FIG. 8.

For assuring practically unitary rotation of clutch case 32 and shift cam 35, yet with certain rotational plays, these members are connected with each other through a plurality of tongue-and-groove connections as at 45 shown in FIG. 8, having certain peripheral gaps such as at 46.

An elongated follower supporting rod 47 is rigidly supported between side wall panels 13 and 14, and a plurality of, herein three, follower levers 48*a*, 48*b*, and 48*c* are pivotably mounted on the rod 47, said levers carrying respective follower rollers 49*a*, 49*b*, and 49*c* kept in rolling and pressure contact with clutch cams 35*a*, 35*b*, and 35*c*, respectively. The clutch cam 35*c* is arranged in the opposite phase by 180 degrees with the cams 35*a* and 35*b*.

The opposite or actuating end of the first follower lever 48*a* is linked through a connecting link 51*a* with first selector lever 52 at an intermediate point 54 thereof between the both ends. In the similar way, the actuating end of the second follower lever 48*b* is linked to second selector lever 53 at its one end 55 through connecting link 51*b*. Further, the actuating end of the third follower lever 48*c* is linked to the first selector lever 52 at its one end at 56 through connecting link 51*c*. The first and the second selector levers 52 and 53 are linked with each other at their neighboring ends by a common pivot pin 57.

Lower gear wheel 58 is mounted rotatably on a stationary shaft 60 extending rigidly outwards from the side wall panel 13, while upper gear wheel 59 is fixedly attached to one end of a rotatable shaft 61 which is mounted in bearings, one of which is shown only schematically at 62, mounted in turn in the wall panels 13 and 14, respectively. An endless belt 63 is threaded around said gear wheels 58 and 59, said belt being operatively connected by a pin 64 to the second selector lever 53 at its intermediate point near to the common linked end 57. For assuring a slipless drive between the both shafts 60 and 61, the belt 63 is formed on its inside surface with gear teeth 63*a* engageable positively with corresponding teeth on gear wheels 58 and 59. The first selector mechanism including selector magnets 10, trip levers 21, clutches 16, cams 35, follower levers 48, connecting links 51 and first and second selector levers 52 and 53 is provided for performing axial selection service for the type head, as was briefly described hereinbefore.

The second selector mechanism including selector magnets 17, clutches 18 and first and second selector levers 65 and 66 is provided further with similar trip levers, clutch cams, follower levers, connecting links and the like operating members. Since these further constituting members are similar in their design and function, we have omitted reference numerals and further detailed analysis to be shown and described herein, only for avoiding otherwise possible confusion of the drawing. It is believed that without such illustration and description, the invention can be easily understood from the foregoing and following disclosures concerning the first selector mechanism. As will be seen, the second selector mechanism is intended to carry out rotational positioning operation for the type head 11.

For this purpose, the second selector lever 66 is hinged at its intermediate point 68 relatively in proximity to the commonly hinged end 67, to the motion-receiving end of a bell crank lever 69 hingedly supported at 71 on a bracket 70 which is fixedly attached to the side wall panel 14, said bell crank lever being fitted with a rotatable V pulley 72.

A bracket 74 is fixedly attached to side wall panel 13 and mounts an arbor 75 which supports rotatably a barrel 76 containing a spiral spring, not shown, one end of which is connected fixedly to the barrel wall, while another or free end of said spring is attached to one end of a transmission wire 73 which is threaded around pulleys 77 and 72, the opposite end of said wire being fixedly attached to stationary pin 78 studded on a mounting bar 79 made integral with the panel 14.

The carriage generally shown at 81 in FIG. 1 is slidably mounted on said rotatable shaft 61 by means of a pair of sleeve elements 82*a* and 82*b*, the both being fixedly attached to said carriage 81. A gear 83 is fixedly mounted on the shaft 61 and, indeed, between said sleeve elements. A yoke, generally shown at 84 and having a pair of integral arms 84*a* and 84*b* embraces with ample plays said gear 83. Said arms are formed with round openings 85 and 86 through which said sleeve elements 82*a* and 82*b* pass relatively rotatably. Motion-receiving arm 87 is made integral with said yoke 84 and normally abuts on the upper edge of the front wall part 81*a*, a tension spring 88 being provided between said arm 87 and an attaching point 89 on the wall part 81*a* serving to position said arm-and-yoke assembly 84, 87, to its said abutting or off-service position for the type head 11. This off-service position is most clearly seen from FIG. 6 in its full lines.

Rack bar 90 is kept in engagement with said gear 83 and mounted slidably between said both arms 84*a* and 84*b*. Said rack bar 90 is formed integrally with arms 90*a* and 90*b* having bearing means 91 and 92, respectively, for rotatably mounting a type head shaft 93 which is formed in turn with a cylindrical stepped part 93*a* for the purpose of preventing unintentional dropping of the shaft 93 carrying fixedly the type head 11 at its top end, while the intermediate pulley 77 is fixedly attached to the bottom end of said shaft 93.

Spacing screw shaft 94, only partly shown because it does not constitute part of the invention, is kept in meshing engagement with a pair of pinions 95 and 96 having corresponding spiral teeth as shown, said pinions being rotatably mounted on the front wall part 81*a* of said carriage 81.

Hammer shaft 97 is rotatably mounted at its both ends by suitable bearing means, not shown, in the wall panels 13 and 14, although said shaft 97 is only partly shown for avoiding otherwise possible confusion. Hammer cam 98 is slidably mounted on the shaft 97, yet being not capable of rotating thereabout, by virtue of the square-cross-section of said shaft. For ensuring a synchronous spacing shift of said hammer cam 98 with the carriage, the latter is formed integrally with a pair of pusher arms shown by chain dotted lines 99*a* and 99*b*. These pusher arms embrace said hammer cam from its both sides, thus providing for unitary axial movements of the carriage and the hammer cam.

Platen 100 is rotatably mounted at 100*a* and 100*b* respectively by side wall panels 13 and 14, as most clearly be seen from FIG. 1. Line feed mechanism therefor may be of conventional design and thus has been omitted for clarification of the drawing.

Figure 15:
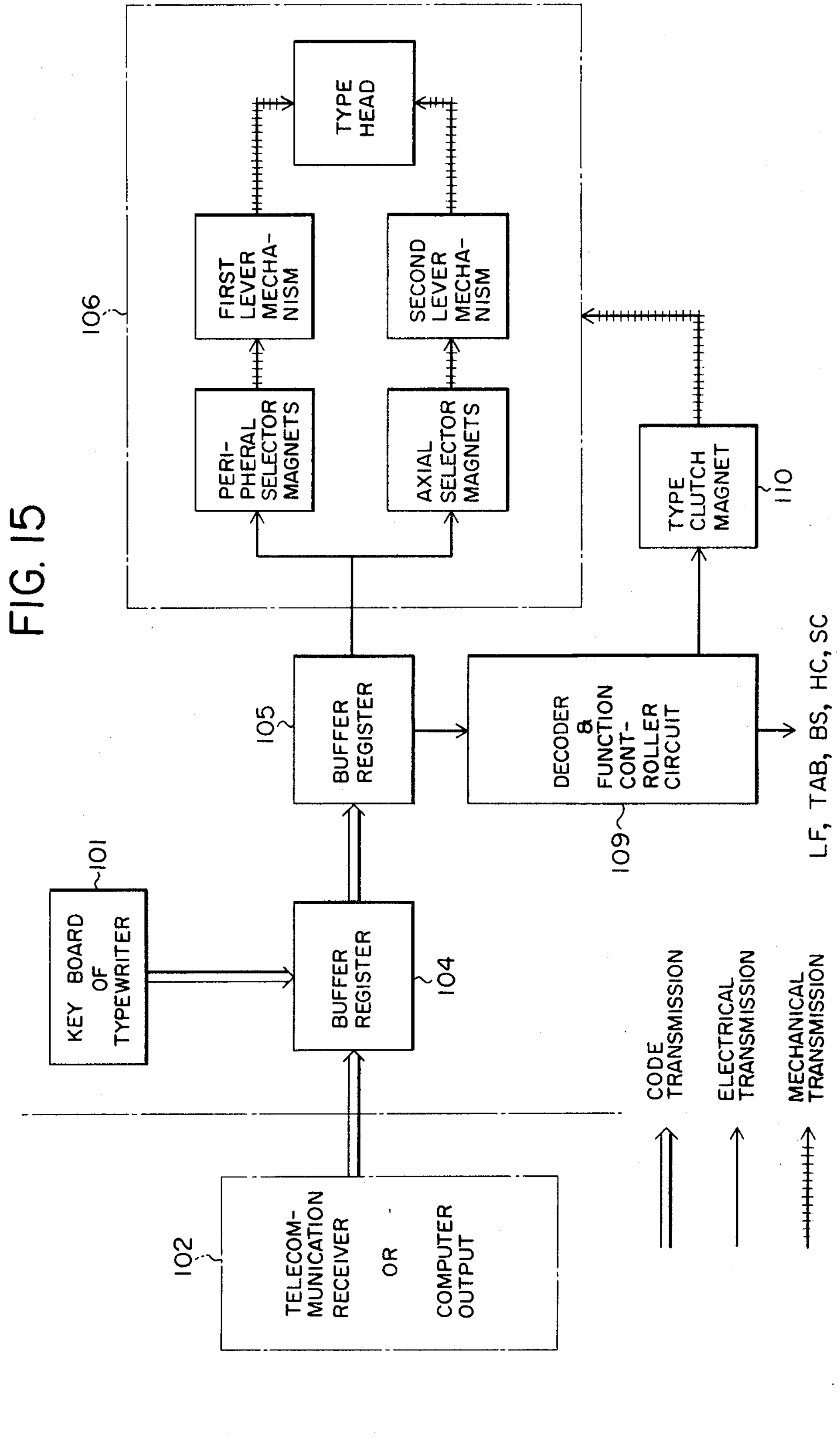
FIG. 15 is a block diagram of the decoder and selection control circuit employed in the typewriter.

In FIG. 15, a preferred combination with the type writing mechanism shown and described with an electronic circuit in the typewriter fitted with said mechanism as its main operating part is schematically shown.

Coded input signals are fed from either key board of typewriter 101 or telecommunication receiver or computer output 102, as the case may be, to buffer register 104, and memorized therein.

On the other hand, when the main drive motor, not shown, is switched on, rotation is transmitted therefrom to main drive shaft 15 and the latter is kept in constant rotation at a predetermined speed such as 1,200 r.p.m. The cam 19 performs naturally the same rotational movement and the break-make contact 20 is intermittently closed once per revolution of the cam 19.

Figure 12:
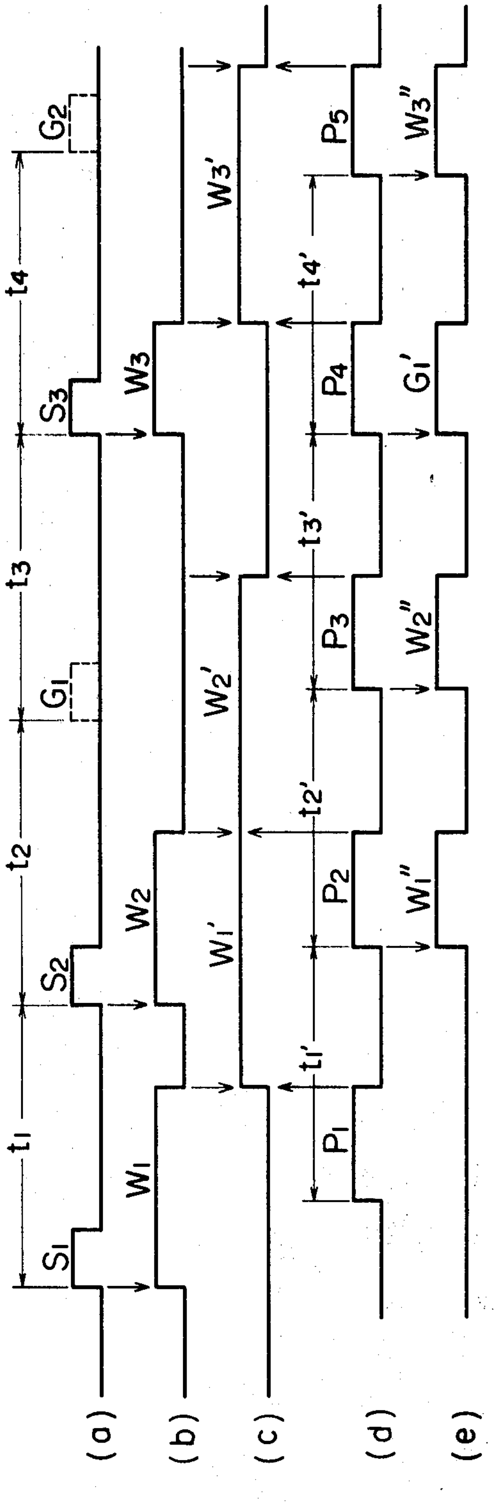
FIG. 12 is a time chart of voltage curves of several kinds of signals appearing at several points of the electronic circuit employed in the invention.
Figure 13:
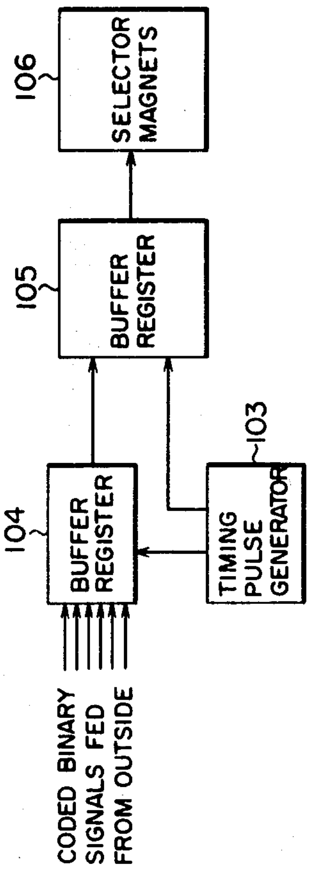
FIG. 13 is a block diagram illustrative of several electronic circuits employed in the invention only by way of example.

This cam-and-contact assembly constitutes a pulse generator 103 in FIG. 13 and the thus delivered pulse series is shown at P1, P2, P3 . . . at (*d*) in FIG. 12 in somewhat idealized manner.

The signals memorized in the buffer register 104, as above mentioned, are then fed to buffer register 105 in accordance with the timing pulses delivered from the pulse generator 103, as hereinabove disclosed in detail.

The coded signals fed to the buffer register 105 are then supplied to the selector magnets 106 and a decoder and function controller circuit 109. In the decoder circuit the function signals are decoded and utilized for operating telecommunication and typewriting functions such as "bell" (BLE), "cancel" (CAN), "backspace" (BS), "carriage return" (CR) and the like, as shown in the columns (0) and (1) in FIG. 14.

On the contrary, the character signals fed to the decoder and function control circuit 109 are discriminated by the function control circuit therein and then fed to a type clutch magnet circuit 110 so as to control the hammering and spacing operations of the typewriter.

On the table shown in FIG. 14, columns 2–5 include characters which correspond to the character signals, and columns 6 and 7 are empty so that the desired characters and symbols such as Greek letters and small letters may be formed thereon in accordance with the need of the users.

Auxiliary table parts illustrate a series of bits $b_1$–$b_4$ and $b_5$–$b_7$ of the 7-bit coded signal. As clearly seen from the table in all function signals both of the $b_6$ and $b_7$ bits are "0." More specifically, the 7-bit coded signals which include "00" of the $b_6$ and $b_7$ bits are function signals, and those including "01," "10," and "11" of the $b_6$ and $b_7$ bits are character signals.

Therefore, only $b_1$–$b_6$ bits of the 7-bit coded signal are utilized for selecting the characters.

FIG. 16 illustrates that a series of bits $b_1$, $b_2$ and $b_3$ serve for the control of axial selecting function of the type head. On the other hand, the remaining bit group of $b_4$, $b_5$ and $b_7$ is utilized for controlling the rotary selection of the type head 11.

When the coded binary information "0000010," for example, which corresponds to a character "  "

is fed to the function controlled 109, the signal information is discriminated as a character signal thereby, and only the $b_1$–$b_6$ bits of said information are utilized for selecting the character.

Thus, in the present embodiment shown in FIG. 1, the 7-bit coded signals for the characters are translated into the 6-bit coded signals by cutting the last bit $b_7$.

More specifically, in the embodiment shown in FIG. 1, an information signal for a character is treated as a six-bit coded binary information such as "000001," of which the first three bits are utilized for shift selection of the type head 11, while the remaining three bits are being utilized for rotary selection thereof. These six bits are introduced in parallel and simultaneously into the first register, indicated by six arrows given in FIG. 13, a selected one of the characters formed on the peripheral surface of the cylindrical type head 11 being selected out by the shift and rotary selective operations.

In the chart shown in FIG. 12, full-lined signal pulses S1, S2, and S3 denote representatively three real characters to be selected out from those on the type head, taken each one bit only from successive six-bit three input signals. In this chart in line (*a*), dotted lined imaginary signal such as at G, represents that there is no incoming signal.

Signal series shown in line (*b*) represent the conditions of buffer register 104, while those shown in line (*c*) illustrate the similar conditions in buffer register 105. In line (*e*) are the thus resulting energizing pulses to be fed to the selector magnets 10*a*, 10*b*, and 10*c* destined for shift-selection service.

Each selector magnet is so arranged that when a bit of the coded signal is "1," its corresponding magnet is energized, and vice versa.

Therefore, since the first three bits are "000," magnets 10*a*, 10*b*, and 10*c* are de-energized.

When the first three bits are "111," magnets 10*a*, 10*b*, and 10*c* are energized.

Under these conditions, armature 30 is attracted towards the magnet 10 in FIG. 4 and the operating conditions are turned into those shown in FIG. 5. Therefore, the trip lever has been shifted from the position shown in FIG. 4 into that shown in FIG. 5. It is noted that cam 350 operates 180 degrees out of place with the cam 35 shown in FIGS. 4 and 5. Thus, the engagement between projection 29 and stop 31 is released, thereby the clutch spring 40 is contracted to embrace the now rotating main shaft 15 and the clutch case 32 and selector cam 35 are brought into rotation in the counterclockwise direction in FIG. 5 until clutch case will have performed just a half revolution and the stop 31 will be brought into engagement with middle lever projection 28, whereby the rotation of clutch case and selector cam is stopped.

The maximum rise of cam 35 will arrive at the highest position shown in FIG. 5, thereby the follower cam roller 49 being elevated in its highest position shown therein. Motion is therefore transmitted from follower lever 48 through connecting link 51 to the related end of first selector lever 52, thereby the latter being brought into its inclined position shown in FIGS. 1 and 2.

With selector magnets 10*a*, 10*b*, and 10*c* kept in their de-energized positions as before, no motion is transmitted to said selector levers 52 and 53.

Figures 10, 11:
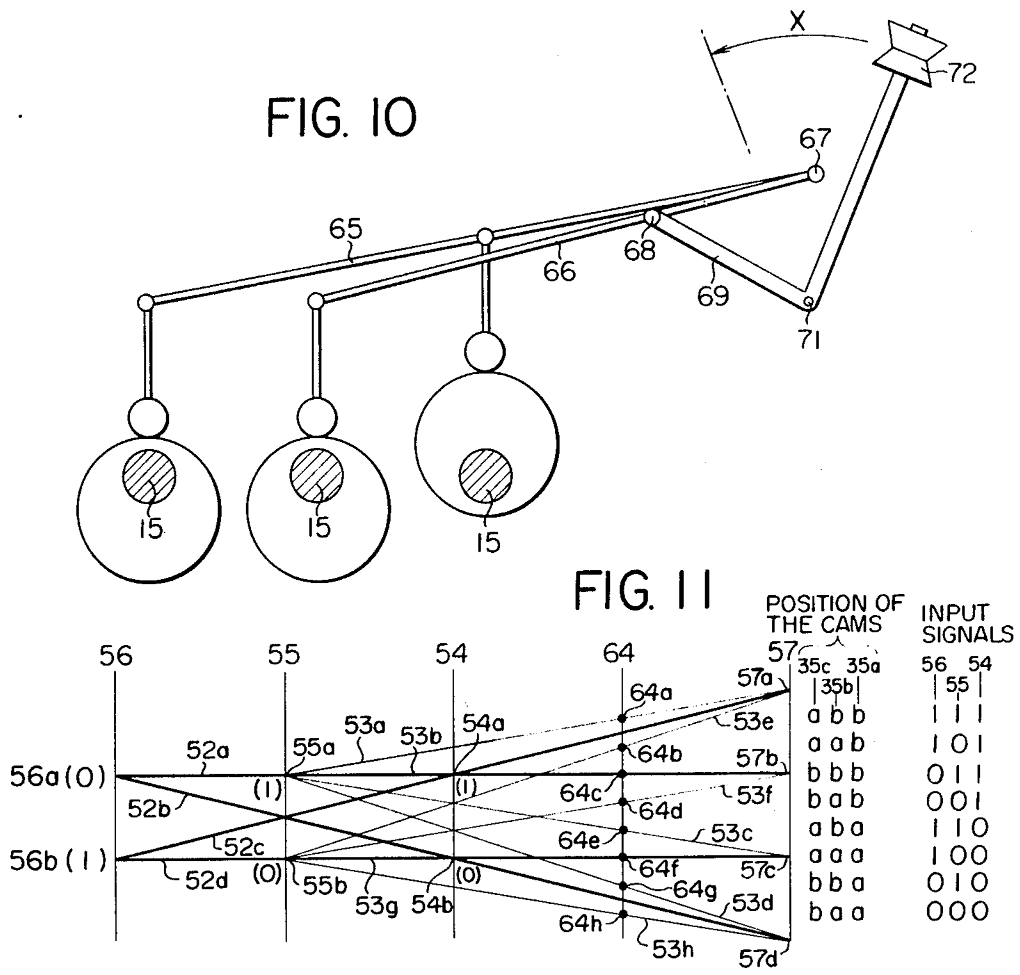
FIG. 10 is an explanatory and schematic representation of a group of, herein three in number, position selector cams which are adapted for selecting the type head in its peripheral orientation.
FIG. 11 is an explanatory schematic illustration of several divided positions for the type head by various and different positioning inclinations of two cam-operated and mutually cooperating positioning bars.

In the chart shown in FIG. 11, "*a*" denotes that the respective selector cam 35 is kept in its highest position, while "*b*" denotes that the cam 35 has been brought into its lowest position.

As shown, lever end 56 may have either of two positions which will naturally be applied respectively to lever end 55, and intermediate lever point 54. Common lever end 57 may occupy four different positions 57*a*, 57*b*, 57*c*, and 57*d*. Thus, intermediate lever point 64 may occupy eight different positions 64*a*–64*h*. These eight different positioning modes are utilized for the desired shift selection service.

Motion for shift selection for the type head is transmitted from the lever point 64 through endless belt 63, upper gear 59, rotatable shaft 61 and drive pinion to rack bar 90 carrying the type head 11.

Figure 6:
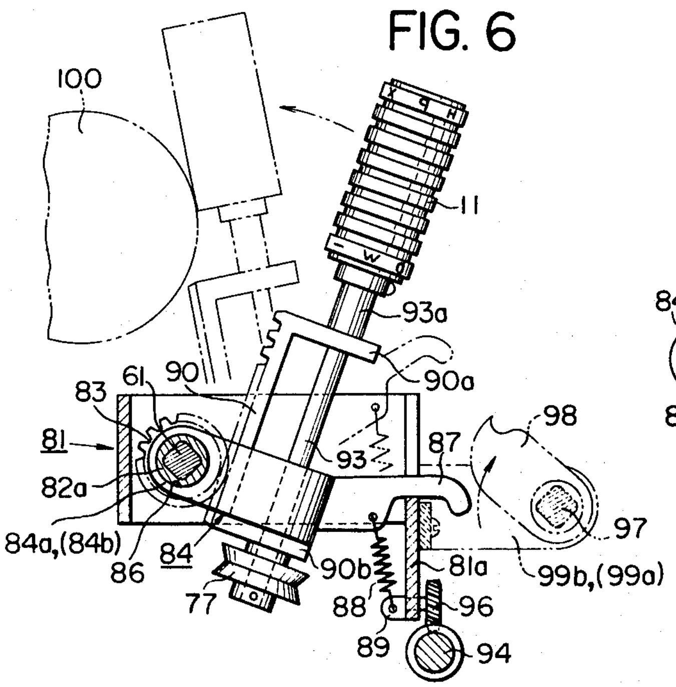
FIG. 6 is a partial cross-sectional view of the type head assembly with its operating hammering mechanism shown in its ready-for-typing position by full lines and in its typing position by chain-dotted lines.
Figure 7:
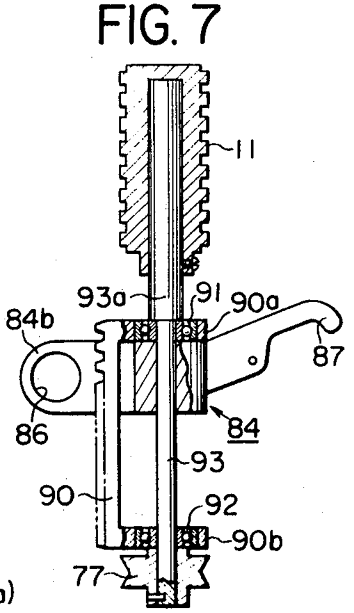
FIG. 7 is a longitudinal sectional view of the type head assembly.

As can most clearly be seen from FIGS. 6 and 7, the type head is provided with eight circular groups of characters and numerals or other symbols, each of said circular groups containing eight characters or the like.

As herein abovementioned, FIG. 16 shows the mutual relation between the input character informations and the characters provided on the type head 11, wherein each character row corresponds to each of said eight circular groups of characters.

Figure 2:
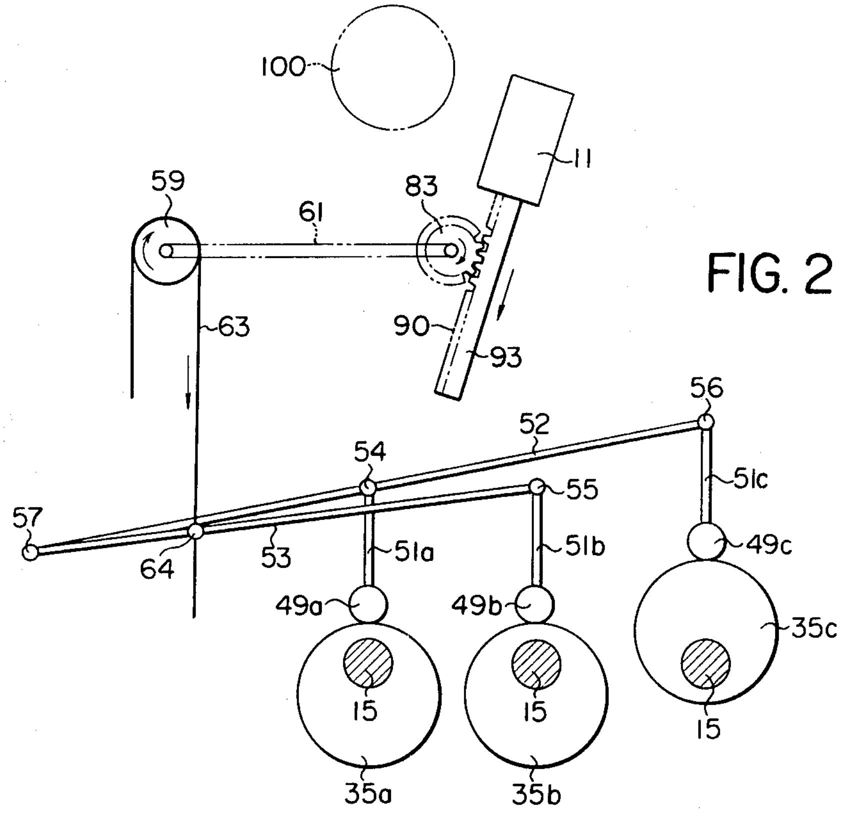
FIG. 2 is an explanatory schematic view of the selector mechanism for selective positioning of a cylindrical type head employed in the foregoing embodiment of the invention wherein however the type head is shown with its uppermost one of circular groups of type characters having been selected out into its operating position relative to a conventional platen cylinder.

In FIG. 2, the type head has been subjected to a shift selection so as to bring the uppermost circular group of characters into its operating position, in corresponding to first three bits of incoming selection signal "000," which is shown in the first line of the auxiliary reference table given in the right-hand extremity of FIG. 11.

Various other bit combinations and the corresponding selective positions of the point 64 are also shown in the same figure.

When the first three bit signal "000" is received, the magnets 10*a*, 10*b*, and 10*c* are de-energized and the cams 35*a*, 35*b*, and 35*c* are brought into the position "*bba*." Thus, the type head is brought always into that position in FIG. 2, corresponding to the bits combination "000."

Figure 3:
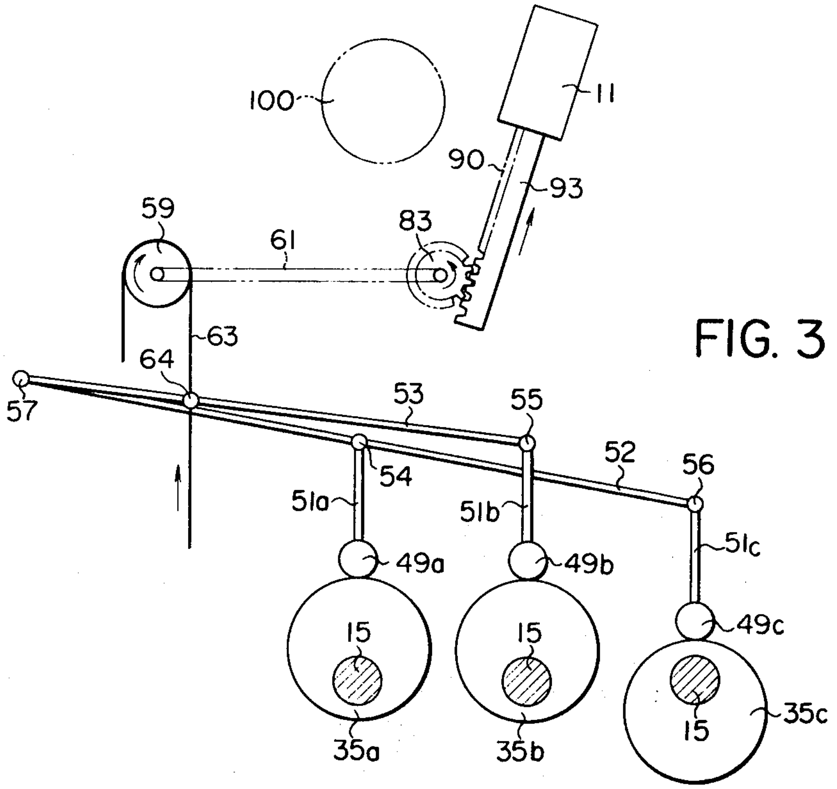
FIG. 3 is a similar view to FIG. 2, wherein however the type head has been so set that the lowest one of circular groups of type characters is in its operative position.

On the contrary, when a first three bit signal "111" of an input six-bit coded signal is fed, the magnet 10 is energized, and the cam 35 is brought into "*aab*" position (see FIG. 3). Such a selected position "*aab*" of the cam 35 corresponds to the first three bits "111" as enumerated in the last line of the table (see also FIG. 11).

Now returning to FIG. 12, the 7-bit coded signal "$S_1$" is memorized in buffer register 104 as "$W_1$." The pulse "$W_1$" is then fed to buffer register 105 by a descending part of a timing pulse $P_1$, and memorized therein as a pulse "$W_1'$."

Next, the pulse signal "$W_1'$" is fed to the selector magnet circuit 106 as pulse "$W_1'$" in response to a rising part of the following timing pulse "$P_2$."

On the other hand, a pulse "$W_2$" corresponding to an input coded signal "$S_2$" is fed to the buffer register 104 according to a descending part of the pulse "$P_2$" and memorized therein as a pulse "$W_2'$."

In the same manner, the input coded informations are transmitted to the typewriter.

Figure 17:
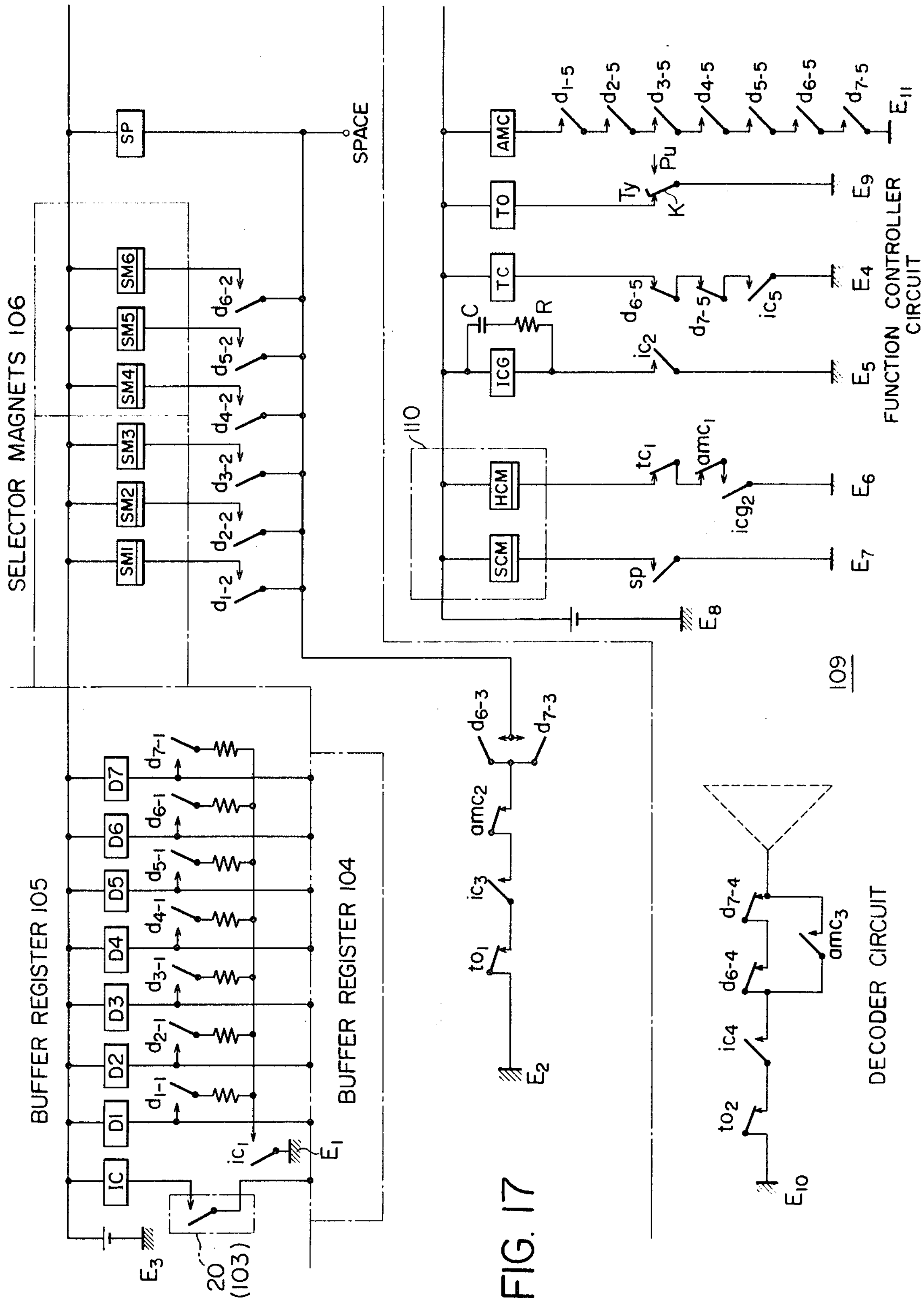
FIG. 17 is a wiring diagram of the selection control circuit employed in the typewriter.

Now referring to FIG. 17, the relays $D_1$–$D_7$ and IC compose the buffer register 105 which memorizes an input code information from the buffer register 104 (see FIG. 13).

In the same figure, the references shown by small letters such as $iC_1$, $iC_2$ . . . $d_{1\text{-}1}$ . . . , $d_{7\text{-}5}$ . . . show the relay contacts of the corresponding capital letters such as IC . . . $D_1$ . . . $D_7$.

A contact 20 in the same figure shows the timing contact which is provided on the clutch shaft 15 and actuated by the cam 19, as shown in FIG. 1. The contact 20 corresponds to the timing pulse generator 103 (see also FIG. 13). The contacts $d_{1\text{-}1}$–$d_{7\text{-}1}$ serve for self-maintaining the relays $D_1$–$D_7$, respectively, and are self-maintained during the energization of the relay IC.

The selector magnets $SM_1$–$SM_6$ are energized by the relay contacts $d_{1\text{-}2}$–$d_{6\text{-}2}$, respectively, and also by relay contact $iC_3$. The selector magnets $SM_1$–$SM_3$ serve for shift-selection of the type head, while the selector magnets $SM_4$–$SM_6$ being destined for rotary-selection.

The decoder circuit detects the function signals such as "LF," "TAB," "BC" or the like corresponding to the informations from the relays $D_1$–$D_7$, the output contact construction of the decoder being shown schematically by a dotted triangle.

The remaining part in FIG. 17 shows the function controller and type clutch magnet circuit for controlling the type hammer clutch and the spacing clutch operations.

In the same circuit, spacing clutch magnet SCM is energized by relay SP which is actuated when any one (or more) of the selector magnets $SM_1$–$SM_7$ is (are) energized. Thus, the spacing magnet SCM is energized at each typewriting operation, thereby the spacing screw shaft 94 shown in FIG. 1 being rotated, so that the carriage is moved stepwise.

A type hammer clutch magnet HCM is controlled by a type cutting relay TC for performing type cutting operation by detecting function signal and by a contact AMC which detects all mark signal "1111111." The hammer clutch magnet HCM is energized when the signals except the all mark and function signals are fed thereto so as to perform typewriting.

A relay TO serves for connecting manually the circuit to the typewriting machine or the tape-boring machine (not shown).

Figure 18:
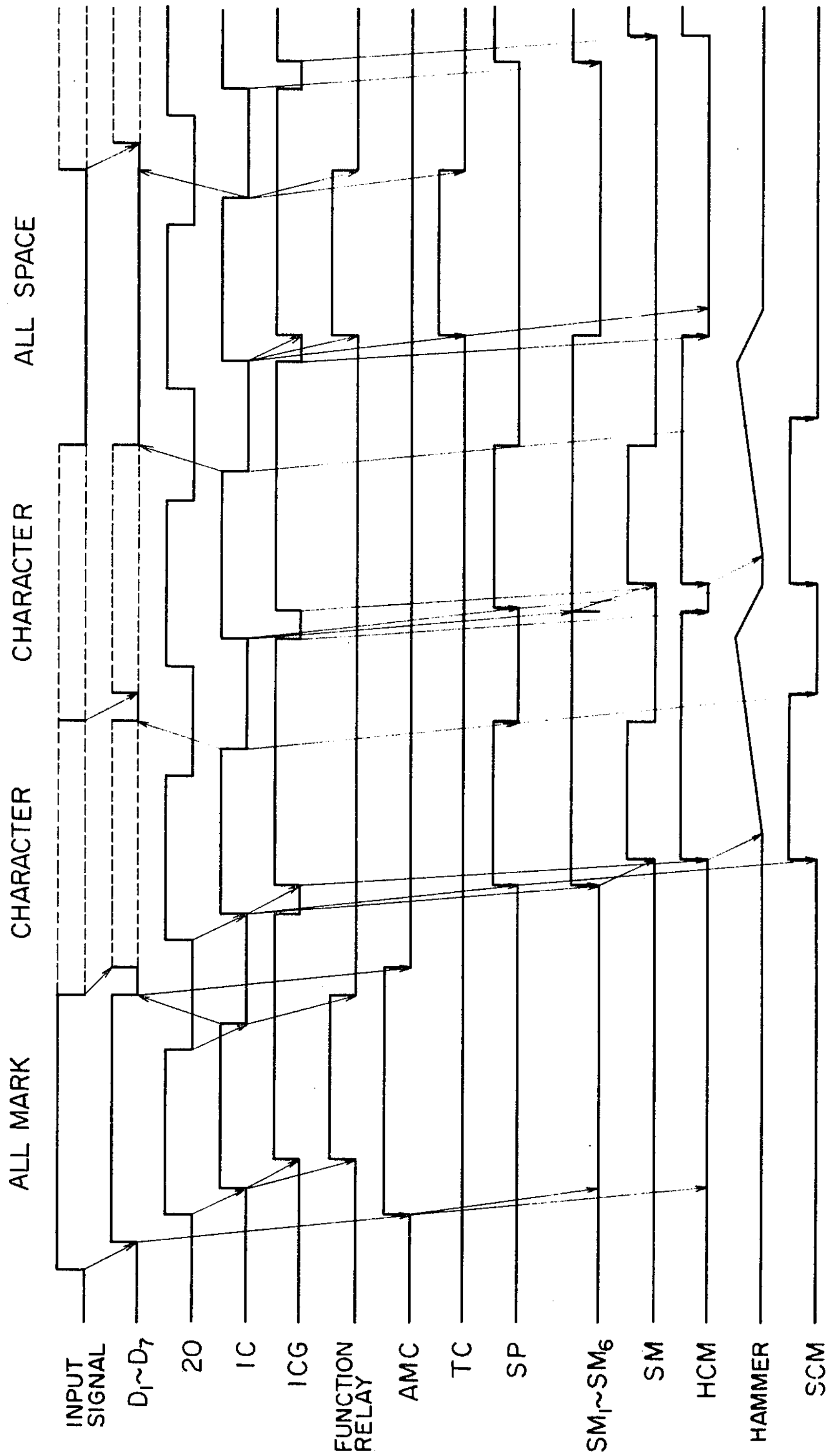
FIG. 18 is a time chart showing the energized or de-energized state of several electronic circuits for selecting characters employed in the invention.

FIG. 18 illustrates a time chart of the character selection circuit shown in FIG. 17, wherein a high level of each pulse shows the existence of a coded information signal or the energizing state, while a low level of each pulse shows the non-existence of an input signal or the de-energizing state.

An all mark signal fed to the buffer register 104 is supplied to the relays $D_1$–$D_7$ of the buffer register 105 and memorized therein.

On the other hand, a timing pulse series as shown in FIG. 12(d) is generated by the contact 20 of the cam 19.

Thus, the relay IC is energized by the timing pulse, thereby the relay $D_1$–$D_7$ being self-maintained. A relay ICG for terminating a relay of operating time is also energized by the actuation of the relay IC.

The magnetic circuit of a relay AMC for detecting all mark signal is composed of the contacts $d_{1-5}$–$d_{7-5}$, and hence the relay AMC is energized corresponding to the actuation of the relay IC, thereby the contact $AMC_2$ being opened.

Thus, the selector magnets $SM_1$–$SM_6$ are not actuated.

The opening of the relay contact $AMC_2$ by the actuation of the relay AMC serves for closing the magnetic exciting circuit of a hammer clutch magnet HCM so as not to perform a hammering operation.

Further, a spacing clutch magnet SCM is not also energized corresponding to the de-energizing of the relay SP.

The decoder circuit is actuated by closure of the contact $AMC_3$ so that functional operation corresponding to the all mark signal is performed, however, the disclosure concerning such an operation being abbreviated in this specification.

When the contact is turned to "off," the relay IC is de-energized, thereby the relay series $D_1$–$D_7$ being de-energized. When the all mark signal is fed as hereinabove mentioned, de-energization of the relays $D_1$–$D_7$ makes the relay AMC de-energize.

Thus, the buffer register is ready for receiving the following input signal.

Next, a character signal is fed to the buffer register 105 through the register 104.

Then, the relay IC is actuated by a timing pulse generated by closure of the contact 20 so that any one or more of the selector magnets $SM_1$–$SM_6$ and the relay SP are energized to operate character selection, while hammer clutch magnet HCM being energized to operate hammering. Further, the spacing clutch magnet SCM is energized by closure of relay SP so as to perform spacing operation.

According to the de-energization of the relay IC, the energized selector magnets are de-energized after a delay time, depending upon their self-maintaining operations, thereby spacing clutch magnet SCM being de-energized.

The relay ICG is also de-energized after a predetermined time delay so that the hammer clutch magnet HCM is de-energized, thereby typewriting being completed.

When an all space input signal is fed to the register 105, the relays $D_1$–$D_7$ are not actuated.

On the other hand, when the relay IC is actuated responding to closure of the contact 20, a function relay (not shown) is energized by the energization of the decoder circuit. Further, a type cutting relay TC is excited by the energization of the relay IC, and thus a magnetic exciting circuit of the hammer clutch magnet HCM is interrupted by "cut off" of the contact $tc_1$ of the relay TC. Therefore, notwithstanding the actuation of the relays IC and ICG, hammering and typewriting are not performed.

When a function signal is received, the relays $D_1$–$D_5$ are energized, and the relays $D_6$ and $D_7$ are not actuated. Therefore, the selector magnets $SM_1$–$SM_6$ and the relay SP are not energized so that the hammer clutch magnet HCM for hammering the character is not energized.

As mentioned above, when the all mark, all space and function input signals are received, no selector magnets $SM_1$–$SM_6$ are energized and hence the character selection clutch is operated as if all space signals were fed thereto. Thus, the type head is lowered in its lowermost position.

By adopting this procedure, so far as no selection signals are received, the type head is always kept in its lowermost position so that the typist can easily and clearly look at the prior printed characters without any hindrance by the occupying cylindrical type head, thereby the typewriting operation may adequately progress.

Relying upon the remaining three bits such as "0001" fed in this case, the third selector magnet **17*c* belonging to the rotary selector mechanism is energized, while the first two magnets 17*a* and 17*b* are kept in their de-energized position as before. Thus, the intermediate point on the first selector lever 65 is raised, while the right-hand ends of the both selector levers 65 and 66** are not affected in any way. This selected position of these selector levers is shown in FIGS. 1 and 10.

Although not specifically shown, eight different positions may be occupied by the actuating point 68 in accordance with various different combinations of the remaining three bits. The pivotal movement of the bell crank lever 69 carrying pulley 72 may be different within its effective angular stroke such as shown at X in FIG. 10. By this swivel movement in one of another direction of the bell crank lever 69 together with wire guide pulley 72, the intermediate pulley 77 is rotated to and fro, thus the shaft 93 together with type head 11 being rotated by a predetermined degree depending upon the remaining half of the incoming coded signal.

For performing the typewriting operation, hammer shaft 97 is rotated by application of a pulse signal which is generated after completion of the aforementioned axial and rotational selective movements, to type clutch magnet, capable of actuating one revolution clutch which is mounted on the extremity of the shaft 97, although not shown.

By the one-revolutionary rotation of shaft 97, in the clockwise direction in FIG. 1, arm 87 is turned counter clockwise in direction together with yoke 84, shaft 93 and type head 11 about shaft 61, so that the head 11 is quickly moved towards a typewriting paper 101 on the platen 100, thus a typewriting operation with the selected character or numeral on the cylindrical head 11 being performed. Whereupon, under the action of return spring 88, the head 11 and its related parts are returned to their ready-for-operative position shown in FIG. 1.

At this moment, the space shaft 94 is rotated one complete revolution, and thus motion is transmitted therefrom through gears 95 and 96 to carriage 81 so that the latter will perform a spacing operation along the shaft 61.

In this case, there is no incoming coded signal during lapse of at least a clock signal P4 or the like. Thus, the shift selection mechanism is actuated to re-position the type head into its lowest working position shown in FIG. 2. Therefore, the typist can conveniently inspect with her eyes the already typewritten information on the paper 101.

As will be seen, each of said clock pulses, P1, P2 . . . at (*d*) in FIG. 12 corresponds to a character or the like information to be typewritten.

Although an exemplary embodiment of the invention has been disclosed herein for purposes of illustration, it will be understood that various changes, modifications, and substitutions may be incorporated in such embodiment without departing from the spirit of the invention as defined by the claims.

What I claim is:

1. A typewriter having a printing head such as a cylindrical type head comprising:

(a) a plurality of shift selector magnets corresponding in number to the number of digits in a coded selection signal, each of said selector magnets being responsive to a single energizing signal which corresponds to a digit in the coded selection signal, (b) a plurality of clutches each operated by a respective one of said plurality of shift selector magnets, (c) a plurality of selector cams operatively connected to respective ones of said plurality of clutches for rotation between alternate positions according to whether the selector magnets associated therewith are energized or de-energized, (d) a selector lever mechanism engaging said plurality of selector cams and adapted to assume a plurality of positions in accordance with the selected combination of positions of the selector cams, (e) transmitting means connected to said selector lever mechanism for translating the motion of said selector lever mechanism into a shift motion of the printing head, (f) hammer magnet means, (g) a type hammer responsive to the hammer magnet means for causing said printing head to perform a print operation, (h) buffer register means comprising a plurality of energizing magnets, corresponding in number to the number of digits contained in a coded selection signal, for receiving coded selection signals, said shaft selector magnets and hammer magnet means being adapted to be energized upon receipt of a coded selection signal, by said energizing magnets, (i) a first plurality of contacts for selectively permitting energization of the shift selector magnets, said first plurality of contacts being responsive to a coded selector signal in the form of a functional code to block energization of said selector magnets to cause said type head to move to its lowermost shift position thereby facilitating the visual inspection of the typewritten information, (j) a second plurality of contacts selectively permitting energization of said hammer magnet means, said second plurality of contacts being responsive to a coded selection signal in the form of a functional code to block energization of said hammer magnet means upon receipt of a functional code, and (k) timing means for supplying periodic timing signals for establishing the timing of the receipt of coded selection signals in said buffer register means.

2. A typewriter as claimed in claim 1 further comprising; a potential source and a third plurality of contacts, responsive to the energization of said energizing magnets in said buffer register means, said plurality of contacts, equal in number to the number of energizing magnets, being coupled between said magnets and said potential source for sustaining the energization of said energizing magnets after receipt of a coded selection signal whereby said printing head remains in the print position dictated by the received coded selection signal until the receipt of the next coded selection signal.

3. A typewriter as claimed in claim 2 further comprising a fourth plurality of contacts responsive to the receiving, in said buffer register means, an all mark coded selection for permitting energization of an all mark magnet and an all mark contact, responsive to the energization of said all mark magnet, for blocking energization of said shift selector magnets to cause said type head to move to its lowermost shift position thereby facilitating the visual inspection of the typewriter information on the receipt of an all mark coded selection signal.

References Cited

UNITED STATES PATENTS

| | | | |
|---|---|---|---|
| 2,847,105 | 8/1958 | Carroll | 197—55X |
| 2,879,876 | 3/1959 | Palmer et al. | 197—16 |
| 2,919,002 | 12/1959 | Palmer | 197—16 |
| 3,168,182 | 2/1965 | Bernard et al. | 197—55 |
| 3,200,928 | 8/1965 | Moore | 197—55 |
| 3,247,941 | 4/1966 | Beattie et al. | 197—55 |
| 3,272,302 | 9/1966 | Segawa et al. | 197—55X |
| 3,302,765 | 2/1967 | Hickerson et al. | 197—16 |
| 3,400,798 | 9/1968 | Smith | 197—1 |
| 3,404,765 | 10/1968 | Gassino et al. | 197—55 |
| 3,405,794 | 10/1968 | Means | 197—55 |

EDGAR S. BURR, Primary Examiner

U.S. Cl. X.R.

101—93; 197—1; 178—34